United States Patent
Shin et al.

(10) Patent No.: US 9,698,928 B2
(45) Date of Patent: Jul. 4, 2017

(54) METHOD AND APPARATUS TO CONTROL INTERFERENCE IN MULTI-HOP NETWORK AND RELAY NODE AND NODE PAIR USING THE METHOD

(71) Applicants: Samsung Electronics Co., Ltd., Suwon-si (KR); Cornell University, Ithaca, NY (US)

(72) Inventors: Won-Jae Shin, Seoul (KR); Ibrahim Issa, Ithaca, NY (US); Silas L. Fong, Ithaca, NY (US); A. Salman Avestimehr, Ithaca, NY (US); Won Jong Noh, Seoul (KR); Jong Bu Lim, Yongin-si (KR); Kyung Hun Jang, Suwon-si (KR)

(73) Assignees: Samsung Electronics Co., Ltd., Suwon-si (KR); Cornell University, Ithaca, NY (US)

( * ) Notice: Subject to any disclaimer, the term of this patent is extended or adjusted under 35 U.S.C. 154(b) by 262 days.

(21) Appl. No.: 14/209,162

(22) Filed: Mar. 13, 2014

(65) Prior Publication Data

US 2014/0355513 A1 Dec. 4, 2014
US 2016/0323042 A9 Nov. 3, 2016

(30) Foreign Application Priority Data

Jun. 4, 2013 (KR) .................. 10-2013-0063917
Jan. 23, 2014 (KR) .................. 10-2014-0008318

(51) Int. Cl.
*H04B 15/00* (2006.01)
*H04J 11/00* (2006.01)

(52) U.S. Cl.
CPC ......... *H04J 11/003* (2013.01); *H04J 11/0023* (2013.01)

(58) Field of Classification Search
CPC ... H04B 15/00; H04B 7/15592; H04J 11/0023
USPC ........................................................ 370/315
See application file for complete search history.

(56) References Cited

U.S. PATENT DOCUMENTS

| 7,953,365 | B2 | 5/2011 | Lim et al. |
| 8,401,057 | B2 | 3/2013 | Sheu et al. |
| 8,644,208 | B2 * | 2/2014 | Unger .................. H04B 7/026 370/315 |

(Continued)

FOREIGN PATENT DOCUMENTS

| EP | 2 101 528 A1 | 9/2009 |
| EP | 2 161 853 A2 | 3/2010 |

(Continued)

OTHER PUBLICATIONS

Extended European Search Report issued Jul. 7, 2014 in counterpart Application No. EP 14159437.4 (5 pages, in English).

*Primary Examiner* — Chi H Pham
*Assistant Examiner* — Robert Lopata
(74) *Attorney, Agent, or Firm* — NSIP Law

(57) ABSTRACT

A method and apparatus to control interference in a relay node are provided and include simultaneously receiving a symbol from source nodes, adjusting channel coefficients; and relaying the symbol to destination nodes with adjusted channel coefficients. The simultaneously receiving and the relaying are performed during a symbol transmission process between the source and destination nodes.

20 Claims, 9 Drawing Sheets

(56) References Cited

U.S. PATENT DOCUMENTS

| | | | |
|---|---|---|---|
| 2006/0270363 A1* | 11/2006 | Sandhu | H04B 7/026 455/101 |
| 2007/0147308 A1 | 6/2007 | Hart | |
| 2009/0190634 A1* | 7/2009 | Bauch | H04B 7/2606 375/211 |
| 2009/0296626 A1* | 12/2009 | Hottinen | H04B 7/155 370/315 |
| 2010/0091697 A1 | 4/2010 | Vucetic et al. | |
| 2010/0215009 A1 | 8/2010 | Yu et al. | |
| 2011/0026427 A1* | 2/2011 | Wang | H04B 7/0452 370/252 |
| 2011/0096722 A1* | 4/2011 | Jung | H04L 25/0204 370/328 |
| 2012/0020279 A1 | 1/2012 | Kim et al. | |
| 2012/0076243 A1* | 3/2012 | Gresset | H04J 11/0026 375/320 |
| 2012/0184203 A1* | 7/2012 | Tulino | H04W 52/244 455/7 |
| 2012/0213101 A1* | 8/2012 | Shimizu | H04B 7/15557 370/252 |
| 2012/0257695 A1* | 10/2012 | Li | H04B 7/026 375/340 |
| 2013/0089023 A1* | 4/2013 | Shin | H04B 7/155 370/315 |
| 2013/0336370 A1* | 12/2013 | Jovanovic | H04L 25/03019 375/214 |
| 2014/0003264 A1* | 1/2014 | Shin | H04B 7/0689 370/252 |
| 2015/0067454 A1* | 3/2015 | Benammar | H04L 5/0023 714/807 |
| 2015/0092877 A1* | 4/2015 | Sivaprakasam | H04B 7/10 375/267 |
| 2015/0124694 A1* | 5/2015 | Benammar | H04B 7/15528 370/315 |

FOREIGN PATENT DOCUMENTS

| | | |
|---|---|---|
| EP | 2 434 660 A1 | 3/2012 |
| KR | 10-2010-0060958 A | 6/2010 |
| KR | 10-1089293 B1 | 12/2011 |
| KR | 10-1102084 B1 | 1/2012 |

* cited by examiner

METHOD AND APPARATUS TO CONTROL INTERFERENCE IN MULTI-HOP NETWORK AND RELAY NODE AND NODE PAIR USING THE METHOD

CROSS-REFERENCE TO RELATED APPLICATION(S)

This application claims the benefit under 35 USC 119(e) of U.S. Provisional Application No. 61/778,718, filed on Mar. 13, 2013, in the U.S. Patent and Trademark Office, and under 35 USC 119(a) of Korean Patent Application No. 10-2013-0063917, filed on Jun. 4, 2013, and Korean Patent Application No. 10-2014-0008318, filed on Jan. 23, 2014, in the Korean Intellectual Property Office, the entire disclosures of which are hereby incorporated by reference for all purposes.

BACKGROUND

1. Field

The following description relates to a method and apparatus controlling interference in a multi-hop network, and a relay node and a node pair using the method.

2. Description of Related Art

A communications system is a collection of individual communications networks, transmission systems, relay stations, tributary stations, and data terminal equipment (DTE) usually capable of interconnection and interoperation to form an integrated whole. However, only 1% of mobile devices or stand-alone electronic devices existing are connected to one another over a network. However, with the development of communication technologies and the trend toward unification through device integration, smart phones, sensor devices, and other communication devices form a large network. In addition, a large number of users of communication terminals use a various applications for content sharing, synchronization, outputting, and gaming using wireless connection between devices. To respond to an increased demand for connectivity, wireless access technologies may support a device-to-device (D2D) communication beyond a cellular communication using an existing infrastructure.

The D2D communication in an early stage is based on a single-hop transmission technology, but is moving toward multiple hops. Additionally, in one communication scenario including a single source node and a single destination node, an existing relay technology generally employs a plurality of relay nodes to obtain a diversity gain or a multiplexing gain. However, it is expected that a plurality of node pairs will often transmit signals concurrently in a so-called multiple unicast multi-hop network. Accordingly, a need exists to control interference between a plurality of node pairs and a plurality of relay nodes.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an illustrative example, there is provided a method to control interference in a relay node, including simultaneously receiving a symbol from source nodes; adjusting channel coefficients; and relaying the symbol to destination nodes with adjusted channel coefficients. The simultaneously receiving and the relaying are performed during a symbol transmission process between the source and destination nodes.

A number of the symbol transmission process may be equal to or greater than a number of symbols simultaneously received.

The relaying of the symbol may include using one of an amplify-and-forward (AF) scheme, a quantize-and-forward (QF) scheme, and a compute-and-forward (CF) scheme, based on the channel coefficients.

The symbol transmission process may correspond to a time slot.

The symbol transmission process may correspond to a frequency band.

The relaying of the symbol may include relaying the symbol through channels between the source and destination nodes.

The relaying of the symbol may include removing an interference channel from among channels between the source nodes and the destination nodes by adjusting the channel coefficients; and relaying the symbol, using the channels between the source nodes and the destination nodes from which the interference channel is removed.

The removing of the interference channel may include receiving, from a source node among the source nodes, channel information between the source node and relay nodes; transmitting channel information between the relay nodes and a destination node among the destination nodes to the destination node; receiving feedback information for the channel information between the relay nodes and the destination node from the destination node; and adjusting the channel coefficients based on the feedback information and removing the interference channel.

The relaying of the symbol may include generating an end-to-end channel matrix, using a first channel matrix between the source nodes and relay nodes, a second channel matrix between the relay nodes and the destination nodes, and the channel coefficients; and relaying the symbol from the source nodes to the destination nodes using the end-to-end channel matrix.

In response to two source nodes and two destination nodes being provided, the receiving, and the relaying may be performed during a first symbol transmission process, a second symbol transmission process, and a third symbol transmission process.

The relaying of the symbol may include in the first symbol transmission process, relaying the symbol by removing an interference channel between a second source node and the first destination node; in the second symbol transmission process, relaying the symbol by removing an interference channel between the first source node and a second destination node; and in the third symbol transmission process, relaying the symbol, using channels between the source nodes and the destination nodes.

In the third symbol transmission process, the receiving of the symbol may include receiving a symbol from the first source node, the symbol being identical to a symbol received from the first source node in the first symbol transmission process; and receiving a symbol from the second source node, the symbol being identical to a symbol received from the second source node in the second symbol transmission process.

The relaying of the symbol in the first symbol transmission process may include receiving channel information between the second source node and relay nodes from the second source node; transmitting channel information between the relay nodes and the first destination node to the first destination node; receiving feedback information for the channel information between the relay nodes and the first destination node from the first destination node; adjusting the channel coefficients based on the feedback information; and removing the interference channel between the second source node and the first destination node.

The relaying of the symbol in the second symbol transmission process may include receiving channel information between the first source node and relay nodes from the first source node; transmitting channel information between the relay nodes and the second destination node to the second destination node; receiving feedback information for the channel information between the relay nodes and the second destination node from the second destination node; adjusting the channel coefficients based on the feedback information; and removing the interference channel between the first source node and the second destination node.

In response to three source nodes and three destination nodes being provided, the receiving and the relaying may be performed during a first symbol transmission process and a second symbol transmission process.

The relaying of the symbol may include in the first symbol transmission process, relaying the symbol by removing an interference channel between the first source node and a second destination node, and an interference channel between the first source node and a third destination node; and in the second symbol transmission process, relaying the symbol using channels between the source nodes and the destination nodes.

The receiving of the symbol may include in the first symbol transmission process, receiving the symbol from each of the first source node and the second source node; and in the second symbol transmission process, receiving the symbol from each of the second source node and a third source node.

In accordance with an illustrative example, there is provided a method of controlling interference in a node pair, including simultaneously receiving a symbol from source nodes for each of at least one symbol transmission process; transmitting to destination nodes signals for each of the at least one symbol transmission process with adjusted channel coefficients; and extracting the symbol from the signals transmitted.

In accordance with another illustrative example, there is provided a method of controlling interference in a relay node, including simultaneously receiving a real number component symbol and an imaginary number component symbol from source nodes; and relaying the real number component symbol and the imaginary number component symbol to destination nodes with adjusted channel coefficients, The simultaneously receiving and the relaying may be performed during a symbol transmission process between the source and destination nodes.

In accordance with a further illustrative example, there is provided a method of controlling interference in a node pair, including simultaneously receiving a real number component symbol and an imaginary number component symbol from source nodes, for each of at least one symbol transmission process; transmitting to destination nodes, signals for each of the at least one symbol transmission process with adjusted channel coefficients; and extracting the real number component symbol and the imaginary number component symbol from the signals transmitted.

In accordance with an illustrative example, there is provided an apparatus to control interference, including a relay node configured to simultaneously receive a symbol from source nodes, adjust channel coefficients, and relay the symbol to destination nodes with adjusted channel coefficients, wherein the relay node simultaneously receives and the relays the symbol during a symbol transmission process between the source nodes and the destination nodes.

In accordance with another illustrative example, there is provided an apparatus to control interference in a node pair, including a relay node configured to simultaneously receive a symbol from source nodes for each of at least one symbol transmission process, transmit to destination nodes signals for each of the at least one symbol transmission process with adjusted channel coefficients, and extract the symbol from the signals transmitted.

Other features and aspects will be apparent from the following detailed description, the drawings, and the claims.

BRIEF DESCRIPTION OF THE DRAWINGS

These and/or other aspects will become apparent and more readily appreciated from the following description of the embodiments, taken in conjunction with the accompanying drawings in which.

Figure 1:
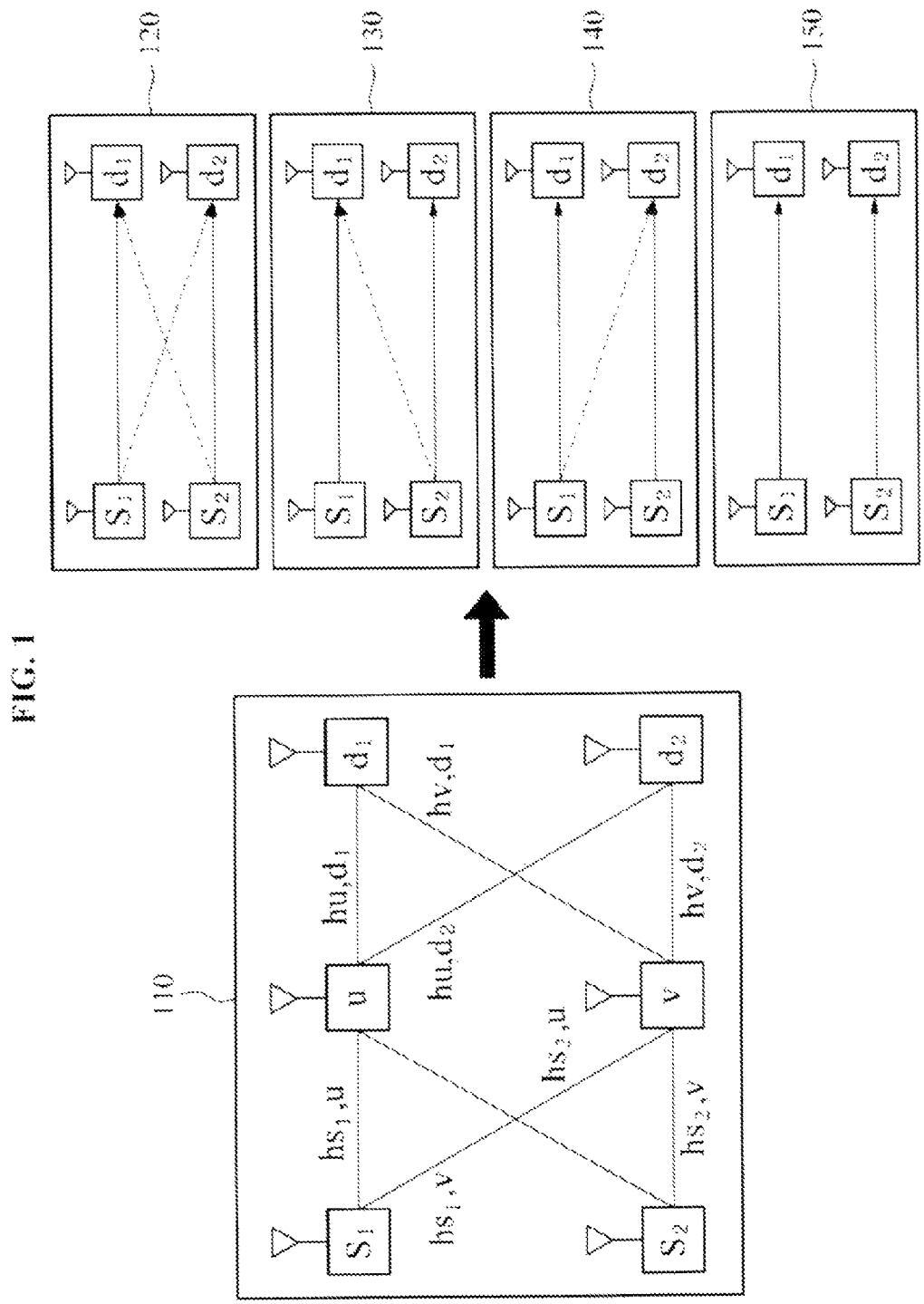
FIG. 1 is a diagram illustrating an example of a multi-hop network and an alternating topology, in accord with an embodiment.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Multi-Hop Network and Alternating Topology

FIG. 1 illustrates an example of a multi-hop network and an alternating topology, in accord with an embodiment.

Referring to FIG. 1, a multi-hop network 110 is a two-hop network including source nodes, relay nodes, and destination nodes. For example, the multi-hop network 110 includes K source nodes, K relay nodes, and K destination nodes. In the multi-hop network 110, the source nodes transmit signals to the destination nodes through the relay nodes. In the multi-hop network 110, users of a cellular system may transmit data to base stations through relays. However, when signals are simultaneously transmitted by different node pairs, signals, symbols, or streams may interfere with each other during a multi-hop process, which may cause interstream interference. In accord with an embodiment, interference in the multi-hop network 110 is controlled based on cooperation between relay nodes and node pairs.

For instance, in the multi-hop network 110, $S_1$ and $S_2$ denote source nodes, u and v denote relay nodes, and $d_1$ and $d_2$ denote destination nodes. In an example in which the source node $S_1$ intends to transmit a symbol to the destination node $d_1$, the source node $S_1$ and the destination node $d_1$ pair up with one another. Each source node $S_i$ includes a message or symbol $W_i$ for each destination node $d_i$ (i∈{1, 2}), pairing up with each source node $S_i$. Additionally, $H_1$ denotes a channel matrix between source nodes and relay nodes, and is represented by $$H_1 = \begin{bmatrix} h_{s_1,u} & h_{s_2,u} \\ h_{s_1,v} & h_{s_2,v} \end{bmatrix}.$$

$H_2$ denotes a channel matrix between relay nodes and destination nodes, and is represented by $$H_2 = \begin{bmatrix} h_{u,d_1} & h_{v,d_1} \\ h_{u,d_2} & h_{v,d_2} \end{bmatrix}.$$

In an example, channel gains may be real-values, and may be drawn from a continuous distribution. In one example, the channel matrices are defined during communication between the node pairs and the relay nodes, and may be communicated to all the nodes.

In a time slot k, a transmission signal of the source node $S_i$ may be defined as $X_{i,k} \in \mathbb{R}$, and a transmission signal of a relay node r may be defined as $X_{r,k} \in \mathbb{R}$. $Y_{r,k}$ denotes a signal received by the relay node r in the time slot k, as shown in Equation 1. $Y_{i,k}$ denotes a signal received from the destination node $d_i$ in the time slot k, as shown in Equation 2.

$$Y_{r,k} = h_{s_1,r} X_{1,k} + h_{s_2,r} X_{2,k} + Z_{r,k}, r \in \{u,v\}, k \in \mathbb{N}, \quad \text{[Equation 1]}$$

$$Y_{i,k} = h_{u,d_i} X_{u,k} + h_{v,d_i} X_{v,k} + Z_{d_i,k}, i \in \{1,2\}, 5 \in \mathbb{N}, \quad \text{[Equation 2]}$$

In Equations 1 and 2, $Z_{r,k}$ and $Z_{d_i,k}$ denote independently and identically distributed (i.i.d.) noise in the relay node r, and i.i.d noise in the destination node $d_i$, respectively, and follow a distribution of $\mathcal{N}(0,1)$. Additionally, $Z_{r,k}$ and $Z_{d_i,k}$ are independent of messages $\{W_1, W_2\}$. $X^n$ is represented to define a random column Vector $[X_1 \, X_2 \, \ldots \, X_n]^T$, and when $\mathcal{S} \subseteq \{1, 2, \ldots, n\}$, $X^{\mathcal{S}}$ is defined as $\{X_k | k \in \mathcal{S}\}$.

In an example of an interference control scheme in the multi-hop network 110, relay nodes and node pairs control interference in the multi-hop network 110, based on mutual cooperation. In the interference control scheme in the multi-hop network 110, the relay nodes remove an interference channel by adjusting channel coefficients, and generate an alternating topology, for example, topologies 120 to 150 illustrated in FIG. 1. In one example, the alternating topology refers to a network between the source nodes and the destination nodes that is occur in turn repeatedly or alternate from an original network between the source nodes and the destination nodes due to a change in connectivity of the interference channel based on time or frequency.

The node pairs transmit and receive at least one symbol using the alternating topology. For example, when K node pairs simultaneously transmit N symbols, K source nodes transmit the N symbols to the relay nodes through M symbol transmission processes. In this example, M may be equal to or greater than N. Additionally, channel coefficients of the relay nodes may be adjusted differently for each of symbol transmission processes and, accordingly, an intensity of an interference signal received by K destination nodes from source nodes, which are not paired up with the K destination nodes, may be changed for each of the symbol transmission processes.

A change in the intensity of the interference signal indicates that an interference channel from source nodes to destination nodes may be changed for each of the symbol transmission processes. For example, in the topology 120, both, an interference channel from the source node $S_1$ to the destination node $d_2$, and an interference channel from the source node $S_2$ to the destination node $d_1$ exists. In the topology 130, an interference channel from the source node $S_2$ to the destination node $d_1$ does exist, but an interference channel from the source node $S_1$ to the destination node $d_2$ does not exist. In the topology 140, an interference channel from the source node $S_1$ to the destination node $d_2$ exists, but an interference channel from the source node $S_2$ to the destination node $d_1$ does not exist. In the topology 150, neither an interference channel from the source node $S_1$ to any of the destination nodes $d_1$ and $d_2$ nor an interference channel from the source node $S_2$ to any of the destination nodes $d_1$ and $d_2$ exists. The destination nodes $d_1$ and $d_2$ may decode the N symbols, based on the alternating topology, using signals received from the interference channels for each of the M symbol transmission processes.

Interference control scheme in multi-hop network including two node pairs

Figure 2A:
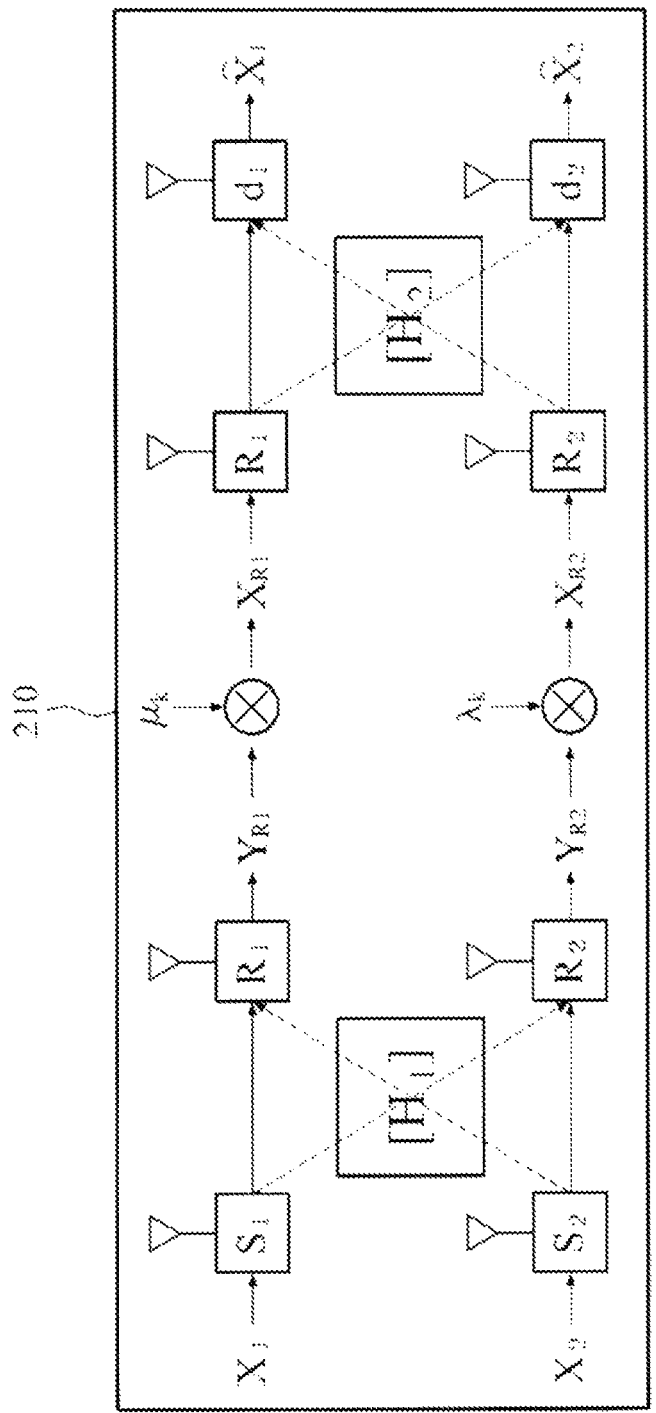
FIGS. 2A through 2C are diagrams illustrating examples of an interference control scheme in a multi-hop network including two node pairs, in accord with an embodiment.
Figure 2B:
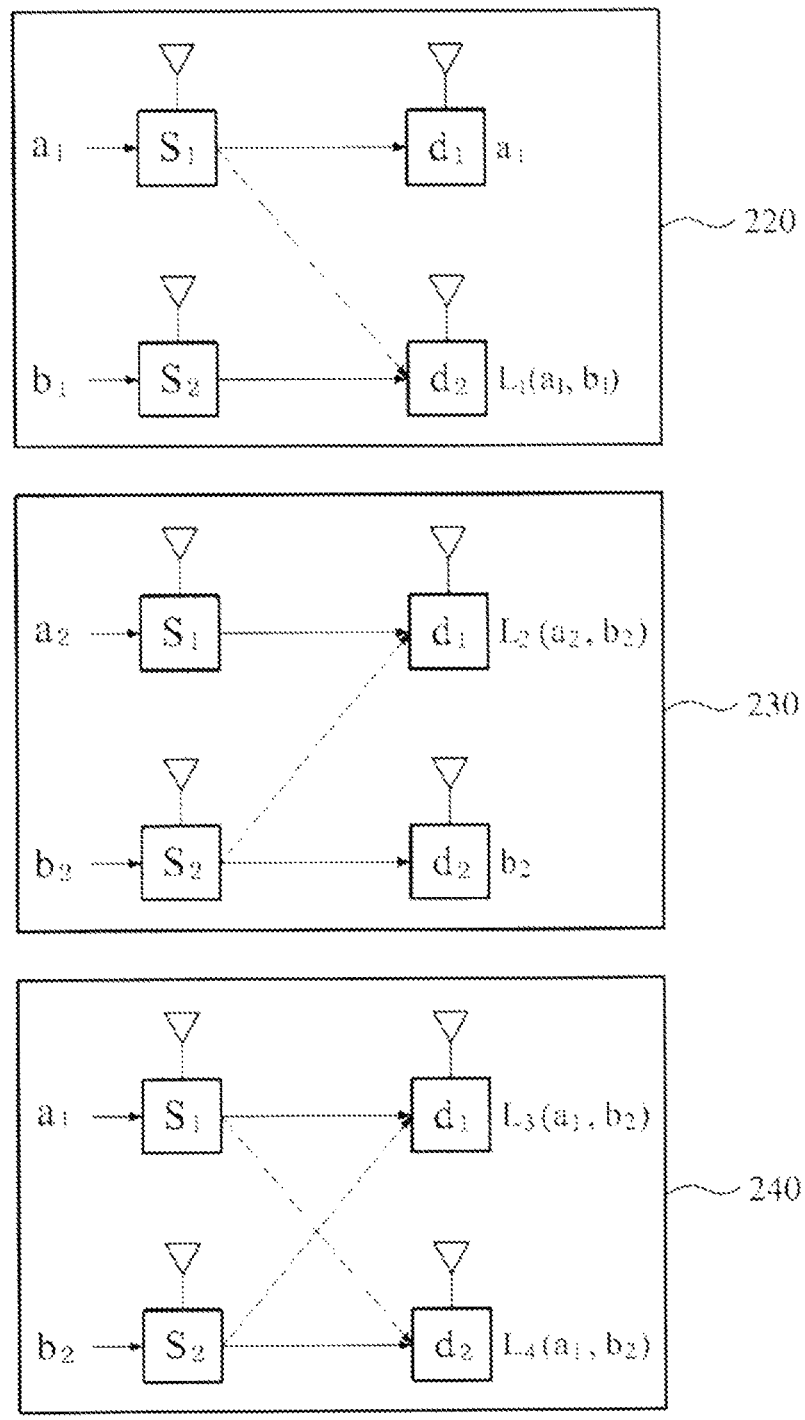
Figure 2C:
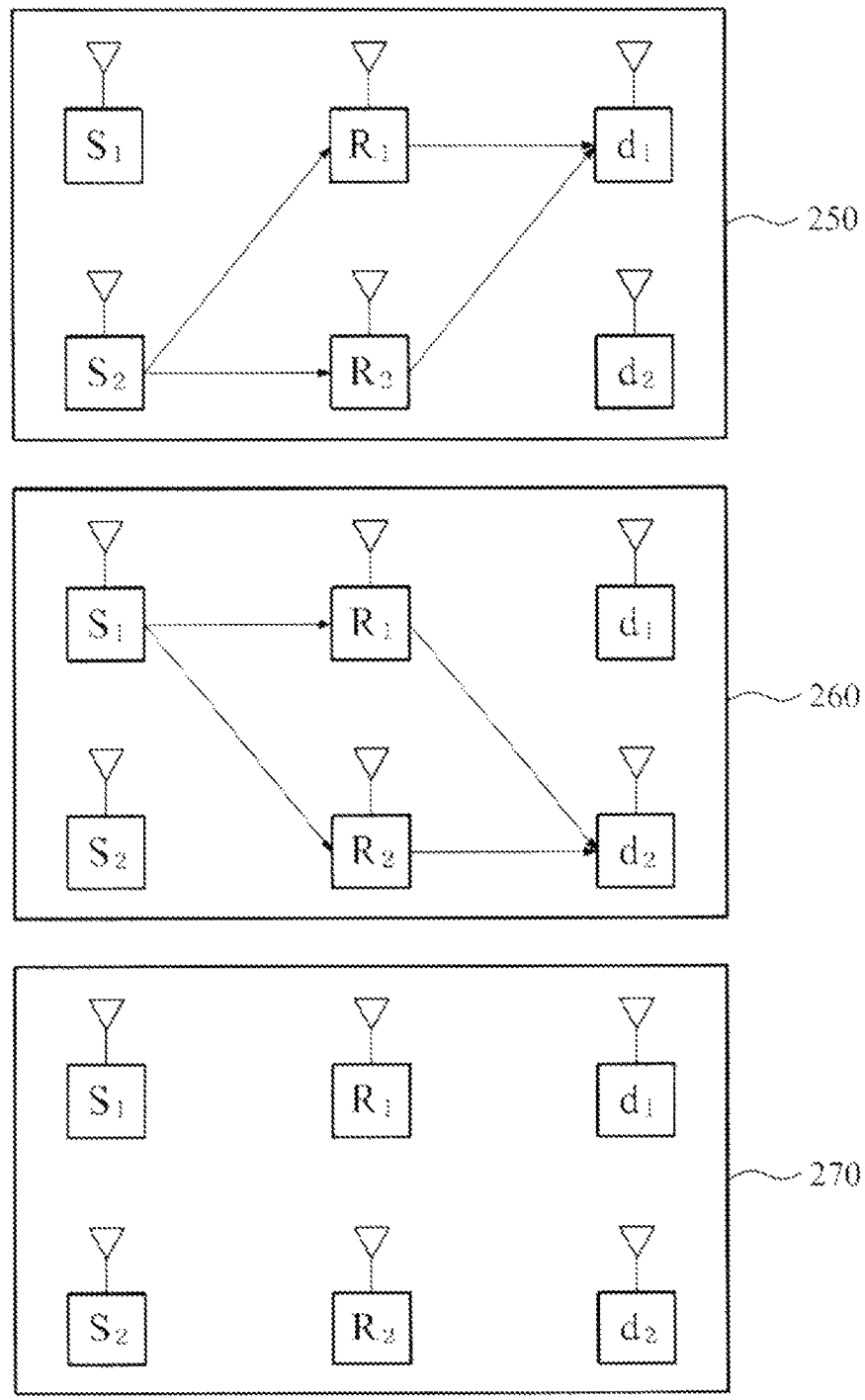

FIGS. 2A through 2C illustrate examples of an interference control scheme in a multi-hop network including two node pairs, in accord with an embodiment. Although the interference control scheme illustrates two node pairs, a person of ordinary skill in the relevant art will appreciate that additional node pairs may be implemented.

Referring to FIG. 2A, a multi-hop network 210 includes two source nodes $S_1$ and $S_2$, two destination nodes $d_1$ and $d_2$, and two relay nodes $R_1$ and $R_2$. In an interference control scheme in the multi-hop network 210, the relay nodes $R_1$ and $R_2$ and node pairs $S_1$, $S_2$, $d_1$ and $d_2$ may use a linear time-varying amplify-and-forward (AF) scheme. Additionally, in an example, the relay nodes $R_1$ and $R_2$ and the node pairs $S_1$, $S_2$, $d_1$ and $d_2$ may use a linear time-varying quantize-and-forward (QF) scheme, or a linear time-varying compute-and-forward (CF) scheme. In another example, the relay nodes $R_1$ and $R_2$ and the node pairs $S_1$, $S_2$, $d_1$ and $d_2$ may control interference in the multi-hop network 210, based on at least one frequency band, instead of at least one time slot. For example, in the interference control scheme in the multi-hop network 210, the relay nodes $R_1$ and $R_2$ and the node pairs $S_1$, $S_2$, $d_1$ and $d_2$ may use a linear frequency-selecting AF scheme, a linear frequency-selecting QF scheme, or a linear frequency-selecting CF scheme. The following description is provided based on the linear time-varying AF scheme.

In an example in which two node pairs $S_1$, $S_2$, $d_1$ and $d_2$ are provided, when the linear time-varying AF scheme is used in the relay nodes $R_1$ and $R_2$ and the node pairs $S_1$, $S_2$, $d_1$ and $d_2$, conditions (c-1), (c-2), and (c-3) may be assumed in the interference control scheme of the multi-hop network 210. In this example, the condition (c-1) may indicate that all channel gains are nonzero. The conditions (c-2) and (c-3) may be represented, as shown in Equation 3.

$$(c\text{-}2)\ \mathrm{rank}\,(H_i) = 2,\ i \in \{1, 2\}.$$

$$(c\text{-}3)\ \mathrm{rank}\left(H^i \triangleq \begin{bmatrix} h_{u,d_1}h_{s_i,u} & h_{v,d_1}h_{s_i,v} \\ h_{u,d_2}h_{s_i,u} & h_{v,d_2}h_{s_i,v} \end{bmatrix}\right) = 2,$$

$$i \in \{1, 2\},\ \bar{i} = 3 - i.$$

[Equation 3]

Signals received by destination nodes in the time slot k may be represented, as shown in Equation 4.

$$\begin{bmatrix} Y_{1,k} \\ Y_{2,k} \end{bmatrix} = H_2 \begin{bmatrix} \mu_k & 0 \\ 0 & \lambda_k \end{bmatrix} H_1 \begin{bmatrix} X_{1,k-1} \\ X_{2,k-1} \end{bmatrix} + \begin{bmatrix} \tilde{Z}_{1,k} \\ \tilde{Z}_{2,k} \end{bmatrix}$$

$$= G_k \begin{bmatrix} X_{1,k-1} \\ X_{2,k-1} \end{bmatrix} + \begin{bmatrix} \tilde{Z}_{1,k} \\ \tilde{Z}_{2,k} \end{bmatrix},$$

[Equation 4]

In Equation 4, $\mu_k$ and $\lambda_k$ denote channel coefficients or AF coefficients in the time slot k, and $\tilde{Z}_{i,k}$ denotes effective noise in the destination node $d_i$ ($i \in \{1, 2\}$) and is represented by $\tilde{Z}_{i,k} = h_{u,d_i}\mu_k Z_{u,k-1} + h_{v,d_i}\lambda_k Z_{v,k-1} + Z_{d_i,k}$. Additionally, $G_k$ denotes an equivalent end-to-end channel matrix, and is represented by $$G_k = H_2 \begin{bmatrix} \mu_k & 0 \\ 0 & \lambda_k \end{bmatrix}.$$

$G_k$ may also be represented, as shown in Equation 5.

$$G_k = \begin{bmatrix} \mu_k h_{u,d_1}h_{s_1,u} + \lambda_k h_{v,d_1}h_{s_1,v} & \mu_k h_{u,d_1}h_{s_2,u} + \lambda_k h_{v,d_1}h_{s_2,v} \\ \mu_k h_{u,d_2}h_{s_1,u} + \lambda_k h_{v,d_2}h_{s_1,v} & \mu_k h_{u,d_2}h_{s_2,u} + \lambda_k h_{v,d_2}h_{s_2,v} \end{bmatrix}$$

[Equation 5]

$G_k$ may be also represented by $$G_k = \begin{bmatrix} \alpha_{1,k} & \beta_{1,k} \\ \alpha_{2,k} & \beta_{2,k} \end{bmatrix}.$$

$\tilde{Z}_{i,k}$ may be represented by $Z_{i,k}$ free of a tilde symbol ~. Accordingly, the relay nodes $R_1$ and $R_2$ may relay at least one symbol from the source nodes $S_1$ and $S_2$ to the destination nodes $d_1$ and $d_2$, using the end-to-end channel matrix. The signals received at the destination nodes $d_1$ and $d_2$ in the time slot k may be represented, as shown in Equation 6.

$$Y_{i,k} = \alpha_{i,k} X_{1,k} + \beta_{i,k} X_{2,k} + Z_{i,k}, k \in \{1, 2, \ldots, n\}$$

[Equation 6]

In Equation 6, $Z_{i,k}$ depends on the channel coefficients and AF factors. Accordingly, a scale of the $Z_{i,k}$ may not be changed by a power constraint P.

In the interference control scheme in the multi-hop network 210, the relay nodes $R_1$ and $R_2$ and the node pairs $S_1$, $S_2$, $d_1$ and $d_2$ may use the linear time-varying AF scheme. When two symbols are to be transmitted from a node pair, the relay nodes $R_1$ and $R_2$ and the node pairs $S_1$, $S_2$, $d_1$ and $d_2$ may control interference through three symbol transmission processes.

In the linear time-varying AF scheme, each of subsets u and v correspond to a definite subset of a set of real numbers $\mathbb{R}$. In one example, the subset u includes channel coefficients of a first relay node ($\{\mu_k \in U\}_{k=1}^n$), and the subset v includes channel coefficients of a second relay node ($\{\lambda_k \in V\}_{k=1}^n$). The subset u is a set to $U=\{c\}$, and the subset v is a set to $V=\{0, -ch_{u,d_1}h_{s_2,u}/h_{v,d_1}h_{s_2,v}, -ch_{u,d_2}h_{s_1,u}/h_{v,d_2}h_{s_1,v}\}$. A constant c is included in the set of real numbers $\mathbb{R}$, and is selected in the relay nodes to satisfy the power constraint P. The constant is represented by $c = \min\{\sqrt{1/(h_{s_1,u}^2 + h_{s_2,u}^2 + 1)}, l\sqrt{1/(h_{s_1,v}^2 + h_{s_2,v}^2 + 1)}\}$ in which l indicates $\min\{|h_{v,d_1}h_{s_2,v}/h_{u,d_1}h_{s_2,u}|, |h_{v,d_2}h_{s_1,v}/h_{u,d_2}h_{s_1,u}|\}$. Based on the condition (c-1), denominators may be nonzero.

FIG. 2B illustrates symbol transmission processes 220, 230, and 240 in the multi-hop network 210, in accord with an embodiment.

Referring to FIG. 2B, in the symbol transmission process 220, relay nodes $R_1$ and $R_2$ receive symbols $a_1$ and $b_1$ from source nodes $S_1$ and $S_2$, respectively. $a_1^2$ and $b_1^2$ may be less than or equal to the power constraint P, ($a_1^2, b_1^2 \leq P$). Additionally, the relay nodes $R_1$ and $R_2$ remove an interference channel between the source node $S_2$ and the destination node $d_1$, by adjusting channel coefficients. Accordingly, a channel coefficient $\mu_1$ of a relay node $R_1$ may be set to $\mu_1 = c$, and a channel coefficient $\lambda_1$ of a relay node $R_2$ may be set to $\lambda_1 = -ch_{u,d_1}h_{s_2,u}/h_{v,d_1}h_{s_2,v}$. The relay nodes $R_1$ and $R_2$ relay the symbols $a_1$ and $b_1$, using channels between the source nodes $S_1$ and $S_2$ and the destination nodes $d_1$ and $d_2$, from which the interference channel between the source node $S_2$ and the destination node $d_1$ is removed. When $\mu_1 = c$ and $\lambda_1 = -ch_{u,d_1}h_{s_2,u}/h_{v,d_1}h_{s_2,v}$ are substituted to Equation 6, signals received at the destination nodes $d_1$ and $d_2$ in the symbol transmission process 220 may be represented, as shown in Equation 7.

$$y_{1,1} = \alpha_{1,1} a_1 + z_{1,1},$$

and $$y_{2,1} = \underbrace{\alpha_{2,1} a_1 + \beta_{2,1} b_1}_{L_1(a_1, b_1)} + z_{2,1}$$

[Equation 7]

In Equation 7, $y_{1,1}$ denotes a signal received at the destination node $d_1$ in the symbol transmission process 220, $y_{2,1}$ denotes a signal received at the destination node $d_2$ in the symbol transmission process 220. Based on the above-described conditions (c-1) through (c-3), $\alpha_{1,1}$ and $\beta_{2,1}$ may be nonzero. Additionally, $\alpha_{2,1} a_1 + \beta_{2,1} b_1$ is represented by $L_1(a_1, b_1)$. $L_1(a_1, b_1)$ is a linear equation in which the symbols $a_1$ and $b_1$ are linearly combined.

In the symbol transmission process 230, the relay nodes $R_1$ and $R_2$ receive symbols $a_2$ and $b_2$ from the source nodes $S_1$ and $S_2$, respectively. $a_2^2$ and $b_2^2$ may be less than or equal to the power constraint P, ($a_2^2, b_2^2 \leq P$). Additionally, the relay nodes $R_1$ and $R_2$ remove an interference channel between the source node $S_1$ and the destination node $d_2$, by adjusting the channel coefficients. Accordingly, a channel coefficient $\mu_2$ of the relay node $R_1$ is set to $\mu_2 = c$, and a channel coefficient of $\lambda_2$ the relay node $R_2$ is set to $\lambda_2 = -ch_{u,d_2}h_{s_1,u}/h_{v,d_2}h_{s_1,v}$. The relay nodes $R_1$ and $R_2$ relay the symbols $a_2$ and $b_2$, using channels between the source nodes $S_1$ and $S_2$ and the destination nodes $d_1$ and $d_2$, from which the interference channel between the source node $S_1$ and the destination node $d_2$ is removed. When $\mu_2 = c$ and $\mu_2 = -ch_{u,d_2}h_{s_1,u}/h_{v,d_2}h_{s_1,v}$ are substituted to Equation 6, signals received at the destination nodes $d_1$ and $d_2$ in the symbol transmission process 230 are represented, as shown in Equation 8.

$$y_{1,2} = \underbrace{\alpha_{1,2}a_2 + \beta_{1,2}b_2}_{L_2(a_2,b_2)} + z_{1,2}, \quad \text{[Equation 8]}$$

and $$y_{2,2} = \beta_{2,2}b_2 + z_{2,2}$$

In Equation 8, $y_{1,2}$ is a signal received by the destination node $d_1$ in the symbol transmission process 230, $y_{2,2}$ is a signal received by the destination node $d_2$ in the symbol transmission process 230. Based on the above-described conditions (c-1) through (c-3), $\alpha_{1,2}$ and $\beta_{2,1}$ may be nonzero. Additionally, $\alpha_{1,2}a_2 + \beta_{1,2}b_2$ may be represented by $L_2(a_2,b_2)$. $L_2(a_2,b_2)$ is a linear equation in which the symbols $a_2$ and $b_2$ are linearly combined.

In the symbol transmission process 240, the relay nodes $R_1$ and $R_2$ receive, from the source node $S_1$, a symbol $a_1$ that is identical to the symbol received from the source node $S_1$ in the symbol transmission process 220. Also, the relay nodes $R_1$ and $R_2$ receive, from the source node $S_2$, a symbol $b_2$ that is identical to the symbol received from the source node $S_2$ in the symbol transmission process 230. Accordingly, in the symbol transmission process 240, the destination node $d_1$ receives $L_3(a_1,b_2)$ in which the symbols $a_1$ and $b_2$ are linearly combined, and the symbol $a_1$ is extracted from Equations 7 and 8. The destination node $d_2$ receives $L_4(a_1, b_2)$, and the symbol $b_1$ is extracted using Equations 7 and 8. The relay nodes $R_1$ and $R_2$ may relay the symbols $a_1$ and $b_2$, using channels between the source nodes and the destination nodes. Accordingly, in the symbol transmission process 240, when the source nodes $S_1$ and $S_2$ transmit the symbols $a_1$ and $b_2$, respectively, when a channel coefficient $\mu_3$ of the relay node $R_1$ is set to c, and when a channel coefficient $\lambda_3$ of the relay node $R_2$ is set to zero, signals received by the destination nodes $d_1$ and $d_2$ may be represented, as shown in Equation 9.

$$y_{1,3} = \underbrace{\alpha_{1,3}a_1 + \beta_{1,3}b_2}_{L_3(a_1,b_2)} + z_{1,3}, \quad \text{[Equation 9]}$$

$$y_{2,3} = \underbrace{\alpha_{2,3}a_1 + \beta_{2,3}b_2}_{L_4(a_1,b_2)} + z_{2,3}$$

In Equation 9, $y_{1,3}$ denotes the signal received by the destination node $d_1$ in the symbol transmission process 240, and $y_{2,3}$ denotes the signal received at the destination node $d_2$ in the symbol transmission process 240. Based on the above-described conditions (c-1) through (c-3), $\beta_{1,3}$ and $\alpha_{2,3}$ may be nonzero.

Accordingly, when the symbol transmission processes 220 through 240 are performed, the destination node $d_1$ may extract a signal represented, as shown in Equation 10, from the received signals $y_{1,1}, y_{1,2}, y_{1,3}$.

$$y_1^{a_1} = a_1 + z_{1,1}/\alpha_{1,1}, \quad \text{[Equation 10]}$$

and $$y_1^{a_2} = a_2 + \frac{1}{\alpha_{1,2}}z_{1,2} - \frac{\beta_{1,2}}{\alpha_{1,2}\beta_{1,3}}z_{1,3} + \frac{\alpha_{1,3}\beta_{1,2}}{\alpha_{1,1}\alpha_{1,2}\beta_{1,3}}z_{1,1}$$

In Equation 10, $y_1^{a_1}$ denotes a signal associated with the symbol $a_1$ transmitted from the source node $S_1$, and $y_1^{a_2}$ denotes a signal associated with the symbol $a_2$ transmitted from the source node $S_1$. For example, when $\sigma_1^2$ and $\sigma_2^2$ correspond to a noise variance in the signals $y_1^{a_1}$ and $y_1^{a_2}$, $\sigma_1^2$ and $\sigma_2^2$ depend on the channel coefficients and AF factors. Accordingly, the power constraint P may not change a scale of each of $\sigma_1^2$ and $\sigma_2^2$, and a rate, as defined in Equation 11, may be extracted using a preset outercode.

$$R_1 = \frac{1}{6}\left(\log\left(1 + \frac{P}{\sigma_1^2}\right) + \log\left(1 + \frac{P}{\sigma_2^2}\right)\right) \geq \frac{1}{3}\log\frac{P}{\sigma_1\sigma_2} \quad \text{[Equation 11]}$$

Based on Equation 11, the destination node $d_1$ may achieve 2/3 degrees of freedom (DoF). The destination node $d_2$ may also achieve 2/3 DoF. Accordingly, a sum-DoF of the multi-hop network 210 may be 4/3, which may lead to 33% increase, compared to a time division multiplexing (TDM).

The order of the symbol transmission processes 220 through 240 performed at the relay nodes $R_1$ and $R_2$, the source nodes $S_1$ and $S_2$, and the destination nodes $d_1$ and $d_2$ may be changed without departing from the spirit and scope of the described configurations. In an example, in an opposite order to the above-described order, the symbol transmission processes 220 through 240 may be performed, for example, the symbol transmission processes 240, 230, and 220 may be subsequently and sequentially performed. In another example, when the symbol transmission process 230 is first performed, the symbol transmission processes 240, and 220 may be subsequently and sequentially performed.

Additionally, the symbol transmission processes 220 through 240 may be performed using an orthogonal dimension, for example, an orthogonal time-division multiplexing or a an orthogonal frequency-division multiple access. For example, the symbol transmission processes 220 through 240 may be performed, using multiple subcarriers and multiple subbands in an orthogonal frequency-division multiplexing (OFDM).

In the interference control scheme in the multi-hop network, the relay nodes may remove an interference channel between the source nodes $S_1$ and $S_2$ and the destination nodes $d_1$ and $d_2$, based on a part of channel information, which will be further described with reference to FIG. 2C.

Referring to FIG. 2C, a symbol transmission process 250 represents feedback of channel information in the symbol transmission process 220 of FIG. 2B. As described in FIG. 2B, in the symbol transmission process 220, the relay nodes $R_1$ and $R_2$ remove the interference channel between the source node $S_2$ and the destination node $d_1$, by adjusting the channel coefficients. The relay nodes $R_1$ and $R_2$ adjust the channel coefficients based on channel information between the source node $S_2$ and the relay nodes $R_1$ and $R_2$, and channel information between the relay nodes $R_1$ and $R_2$ and the destination node $d_1$.

As shown in FIG. 2C, in the symbol transmission process 250, in accord with an embodiment, a relay node $R_1$ receives channel information from the source node $S_2$. The channel information includes information about a channel between the source node $S_2$ and the relay node $R_1$. A relay node $R_2$ receives channel information from the source node $S_2$. The channel information includes information about a channel between the relay node $R_2$ from the source node $S_2$. The channel information between the source node $S_2$ and the relay node $R_1$, and the channel information between the source node $S_2$ and the relay node $R_2$ may be, for example, channel state information at receiver (CSIR). The relay node $R_1$ estimates channel information between the relay node $R_1$ and a destination node $d_1$, and transmits the estimated channel information to the destination node $d_1$. In turn, the relay node $R_2$ estimates channel information between the relay node $R_2$ and a destination node $d_1$, and transmits the estimated channel information to the destination node $d_1$. The channel information between the relay node $R_1$ and the destination node $d_1$, and the channel information between the relay node $R_2$ and the destination node $d_1$ may be, for example, channel state information at transmitter (CSIT). The relay node $R_1$ receives feedback information from the destination node $d_1$ about the channel information between the relay node $R_1$ and a destination node $d_1$, and the relay node $R_2$ receives feedback information from the destination node $d_2$ about the channel information between the relay node $R_2$ and a destination node $d_1$. The relay nodes $R_1$ and $R_2$ may adjust channel coefficients based on the feedback information, and remove an interference channel between the source node $S_2$ and the destination node $d_1$. Accordingly, in the symbol transmission process 250, the relay nodes $R_1$ and $R_2$ remove the interference channel between the source node $S_2$ and the destination node $d_1$, based on a portion of channel information between the destination node $d_1$ and the relay nodes $R_1$ and $R_2$, instead of being based on all of the channel information between the source node $S_2$, the relay nodes $R_1$ and $R_2$, and the destination node $d_1$. For example, channel information between the source node $S_2$ and the relay nodes $R_1$ and $R_2$, and channel information between the destination node $d_1$ and the relay nodes $R_1$ and $R_2$ may be used.

In the symbol transmission process 230 of FIG. 2B, the relay nodes $R_1$ and $R_2$ remove the interference channel between the source node $S_1$ and the destination node $d_2$, by adjusting the channel coefficients. To adjust the channel coefficients, the relay nodes $R_1$ and $R_2$ use channel information between the source node $S_1$ and the relay nodes $R_1$ and $R_2$, and channel information between the destination node $d_2$ and the relay nodes $R_1$ and $R_2$.

In a symbol transmission process 260, in accord with an embodiment, a relay node $R_1$ receives channel information between the source node $S_1$ and the relay node $R_1$ from the source node $S_1$. A relay node $R_2$ receives channel information between the source node $S_1$ and the relay node $R_2$ from the source node $S_1$. The channel information between the source node $S_1$ and the relay node $R_1$, and the channel information between the source node $S_1$ and the relay node $R_2$ are, for example, CSIR. The relay node $R_1$ estimates channel information between the relay node $R_1$ and a destination node $d_2$, and transmits the estimated channel information to the destination node $d_2$. The relay node $R_2$ estimates channel information between the relay node $R_2$ and a destination node $d_2$, and transmits the estimated channel information to the destination node $d_2$. The channel information between the relay node $R_1$ and the destination node $d_2$, and the channel information between the relay node $R_2$ and the destination node $d_2$ are, for example, CSIT.

The relay node $R_1$ receives feedback information for the channel information between the relay node $R_1$ and a destination node $d_2$ from the destination node $d_2$. The relay node $R_2$ receives feedback information for the channel information between the relay node $R_2$ and a destination node $d_2$ from the destination node $d_2$. The relay nodes $R_1$ and $R_2$ adjust channel coefficients based on the feedback information, and remove an interference channel between the source node $S_1$ and the destination node $d_2$. Accordingly, in the symbol transmission process 260, the relay nodes $R_1$ and $R_2$ remove the interference channel between the source node $S_1$ and the destination node $d_2$, based on a portion of channel information between the destination node $d_2$ and the relay nodes $R_1$ and $R_2$, instead of based on all of the channel information including, for example, channel information between the source node $S_1$ and the relay nodes $R_1$ and $R_2$, and channel information between the destination node $d_2$ and the relay nodes $R_1$ and $R_2$ may be used.

In the symbol transmission process 240 of FIG. 2B, the relay nodes relay at least one symbol using channels between the source nodes $S_1$ and $S_2$ and the destination nodes $d_1$ and $d_2$. In the symbol transmission process 240, the relay nodes $R_1$ and $R_2$ do not remove an interference channel between the source nodes $S_1$ and $S_2$ and the destination nodes $d_1$ and $d_2$. Accordingly, in a third symbol transmission process 270 of FIG. 2C, channel information between the source nodes $S_1$ and $S_2$ and the relay nodes $R_1$ and $R_2$, and channel information between the relay nodes $R_1$ and $R_2$ and the destination nodes $d_1$ and $d_2$ are not required.

In an example in which two node pairs, and two relay nodes are provided, feedback of channel information may be performed periodically, for instance, every three time slots corresponding to the symbol transmission processes 250 through 270. Additionally, for each of the symbol transmission processes 250 through 270, the relay nodes may receive, as feedback, only a part of the channel information and, as a result, uplink throughput is enhanced.

Referring to FIGS. 2A through 2C, in the interference control scheme in the multi-hop network, at least one of the relay nodes may include a processor or controller to remove an interference between the source nodes $S_1$ and $S_2$ and the destination nodes $d_1$ and $d_2$. The at least one of the relay nodes would include a transmitter, the processor, and a receiver to perform the interference control scheme.

Interference control scheme in multi-hop network including three node pairs

Figure 3A:
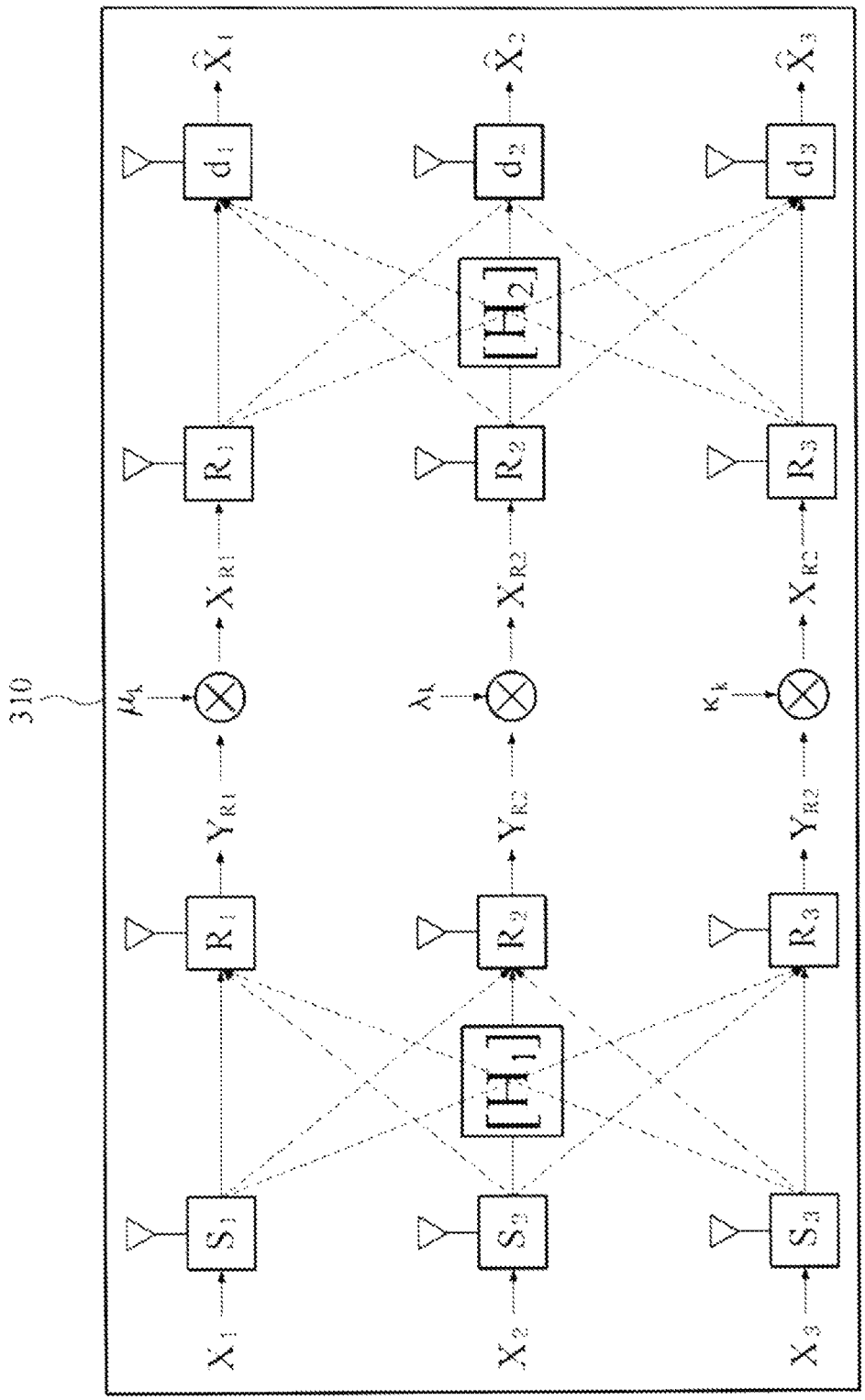
FIGS. 3A and 3B are diagrams illustrating examples of an interference control scheme in a multi-hop network including three node pairs, in accord with an embodiment.
Figure 3B:
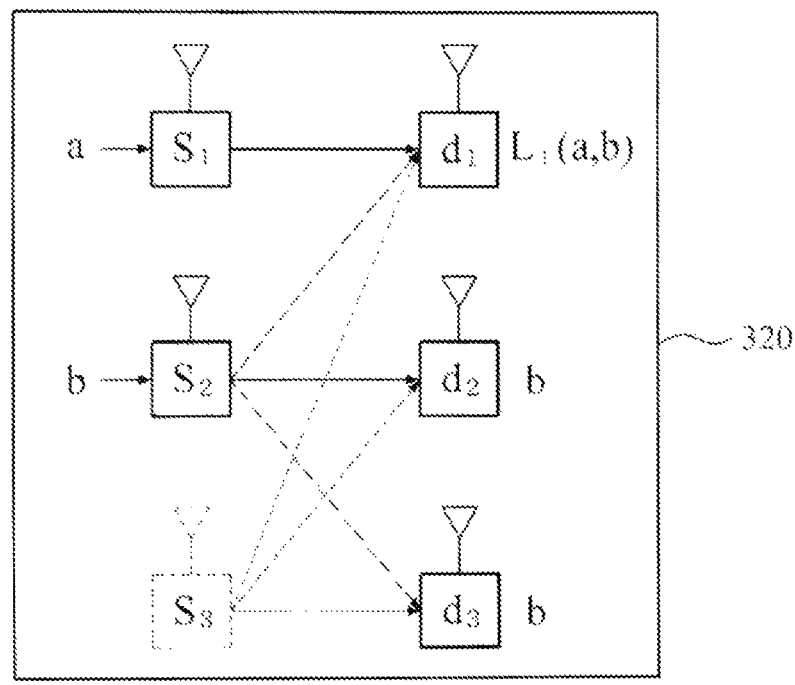
Figure 3B:
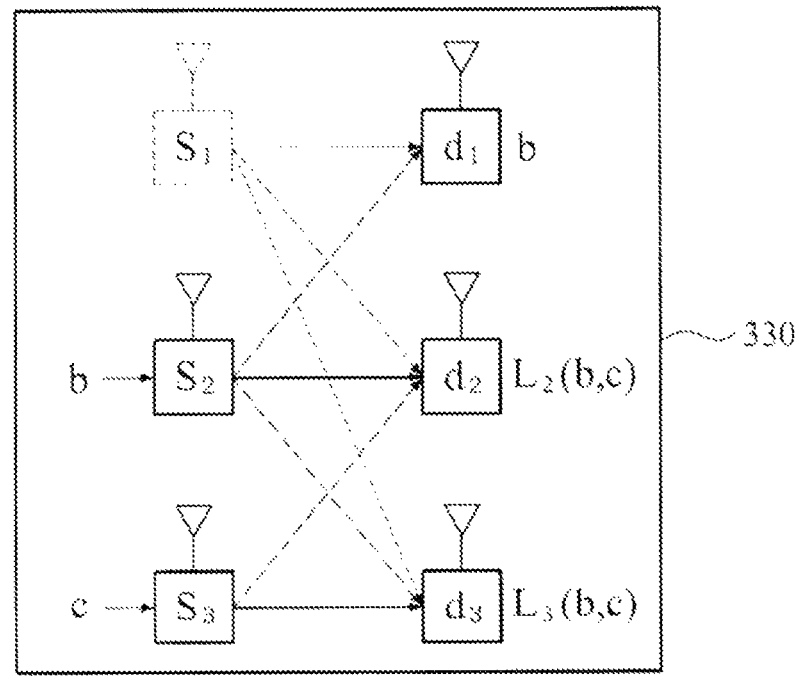

FIGS. 3A and 3B illustrate examples of an interference control scheme in a multi-hop network including three node pairs, in accord with an embodiment.

Referring to FIG. 3A, a multi-hop network 310 includes three source nodes, three destination nodes, and three relay nodes. In an interference control scheme, a larger number of user interference may be controlled, based on an increase in a number of node pairs, and a number of relay nodes. As a result, a topology of the interference control scheme may be more variously changed. Similarly to the interference control scheme of FIGS. 2A through 2C, one of a linear time-varying AF scheme, a linear time-varying QF scheme, a linear time-varying CF scheme, a linear frequency-selecting AF scheme, a linear frequency-selecting QF scheme, and a linear frequency-selecting CF scheme may be used in the interference control scheme of FIGS. 3A and 3B. The following description is provided based on the linear time-varying AF scheme.

In a time slot k, the destination nodes receive signals through a first channel matrix between the source nodes and the relay nodes, channel coefficients of the relay nodes, and a second channel matrix between the relay nodes and the destination nodes, which may be represented, as given in Equation 12 below.

$$\underbrace{\begin{bmatrix} h_2^1 \\ h_2^2 \\ h_2^3 \end{bmatrix} \begin{bmatrix} \mu_1 & 0 & 0 \\ 0 & \lambda_1 & 0 \\ 0 & 0 & \kappa_1 \end{bmatrix}}_{H_1} \underbrace{[h_1^1 \ h_1^2 \ h_1^3]}_{H_1}$$ [Equation 12]

In Equation 12, $\mu_1$ is a channel coefficient of a relay node $R_1$ in a first symbol transmission process, $\lambda_1$ is a channel coefficient of a relay node $R_2$, and $\kappa_1$ is a channel coefficient of a relay node $R_3$. In the interference control scheme in the multi-hop network, an end-to-end channel matrix G is generated using the first channel matrix, the second channel matrix, and the channel coefficients, and an end-to-end channel matrix in the first symbol transmission process is represented by $$\begin{bmatrix} \alpha_{1,1} & \beta_{1,1} & \gamma_{1,1} \\ \alpha_{2,1} & \beta_{2,1} & \gamma_{2,1} \\ \alpha_{3,1} & \beta_{3,1} & \gamma_{3,1} \end{bmatrix}.$$

Accordingly, the relay nodes may relay at least one symbol from the source nodes to the destination nodes, using the end-to-end channel matrix.

Referring to FIG. 3B, in a symbol transmission process 320, source nodes $S_1$ and $S_2$ transmit symbols a and b, respectively, and a source node $S_3$ does not transmit a symbol. Additionally, relay nodes remove an interference channel between the source node $S_1$ and a destination node $d_2$, and an interference channel between the source node $S_1$ and a destination node $d_3$, by adjusting channel coefficients. Because the source node $S_3$ does not transmit a symbol, $\alpha_{2,3}$ and $\alpha_{3,3}$ are zero in the end-to-end channel matrix $$\begin{bmatrix} \alpha_{1,1} & \beta_{1,1} & \gamma_{1,1} \\ \alpha_{2,1} & \beta_{2,1} & \gamma_{2,1} \\ \alpha_{3,1} & \beta_{3,1} & \gamma_{3,1} \end{bmatrix}.$$

Accordingly, the channel coefficients in the symbol transmission process 320 are $$\begin{bmatrix} \mu_1 \\ \lambda_1 \\ \kappa_1 \end{bmatrix} = \text{null}\left( \begin{bmatrix} h_2^2 \circ h_1^{1,T} \\ h_2^3 \circ h_1^{1,T} \end{bmatrix} \right).$$

A symbol $\circ$ represents an element-wise multiplier. Accordingly, a signal received at a destination node $d_1$ is $L_1(a,b)$ in which the symbols a and b are linearly combined, a signal received at the destination node $d_2$ is the symbol b, and a signal received at the destination node $d_3$ is also the symbol b.

In a symbol transmission process 330, source nodes $S_2$ and $S_3$ transmit symbols b and c, respectively, and a source node $S_1$ does not transmit a symbol. Additionally, relay nodes remove an interference channel between the source node $S_3$ and the destination node $d_1$, and an interference channel between the source node $S_3$ and the destination node $d_2$, by adjusting channel coefficients. For example, the channel coefficients in the symbol transmission process 330 are adjusted to $$\begin{bmatrix} \mu_2 \\ \lambda_2 \\ \kappa_2 \end{bmatrix} = \text{null}(h_2^1 \circ h_1^{3,T}).$$

Accordingly, a signal received at the destination node $d_1$ is the symbol b, a signal received at the destination node $d_2$ is $L_2(b,c)$ in which the symbols b and c are linearly combined, and a signal received at a destination node $d_3$ is $L_3(b,c)$ in which the symbols b and c are linearly combined. The destination node $d_1$ extracts the symbol a from $L_1(a,b)$, because the destination node $d_1$ receives $L_1(a,b)$ in the symbol transmission process 320 and receives the symbol b in the symbol transmission process 330. Similarly, the destination node $d_3$ extracts the symbol c from $L_3(b,c)$, because the destination node $d_3$ receives the symbol b in the symbol transmission process 320 and receives $L_3(b,c)$ in the symbol transmission process 330. Additionally, the destination nodes $d_1$, $d_2$, and $d_3$ extract symbols transmitted by the source nodes $S_1$, $S_2$, and $S_3$, based on signals received from the relay nodes. The destination node $d_2$ receives the symbol b in the symbol transmission process 320.

Through the symbol transmission processes 320 and 330, each of the destination nodes $d_1$, $d_2$ and $d_3$ achieve 1/2 DoF. Accordingly, a sum-DoF of the multi-hop network 310 is 3/2, which may lead to 50% increase, compared to TDM, and is equal to a DoF of an interference alignment (IA) scheme.

Similarly to the example of the two node pairs, the order of the symbol transmission processes 320 and 330 may be changed without departing from the spirit and scope of the described configurations.

Referring to FIGS. 3A through 3B, in the interference control scheme in the multi-hop network, at least one of the relay nodes may include a processor or controller to remove an interference between the source nodes $S_1$, $S_2$, and $S_3$ and the destination nodes $d_1$, $d_2$, and $d_3$. The at least one of the relay nodes would include a transmitter, the processor, and a receiver to perform the interference control scheme.

Figure 4:
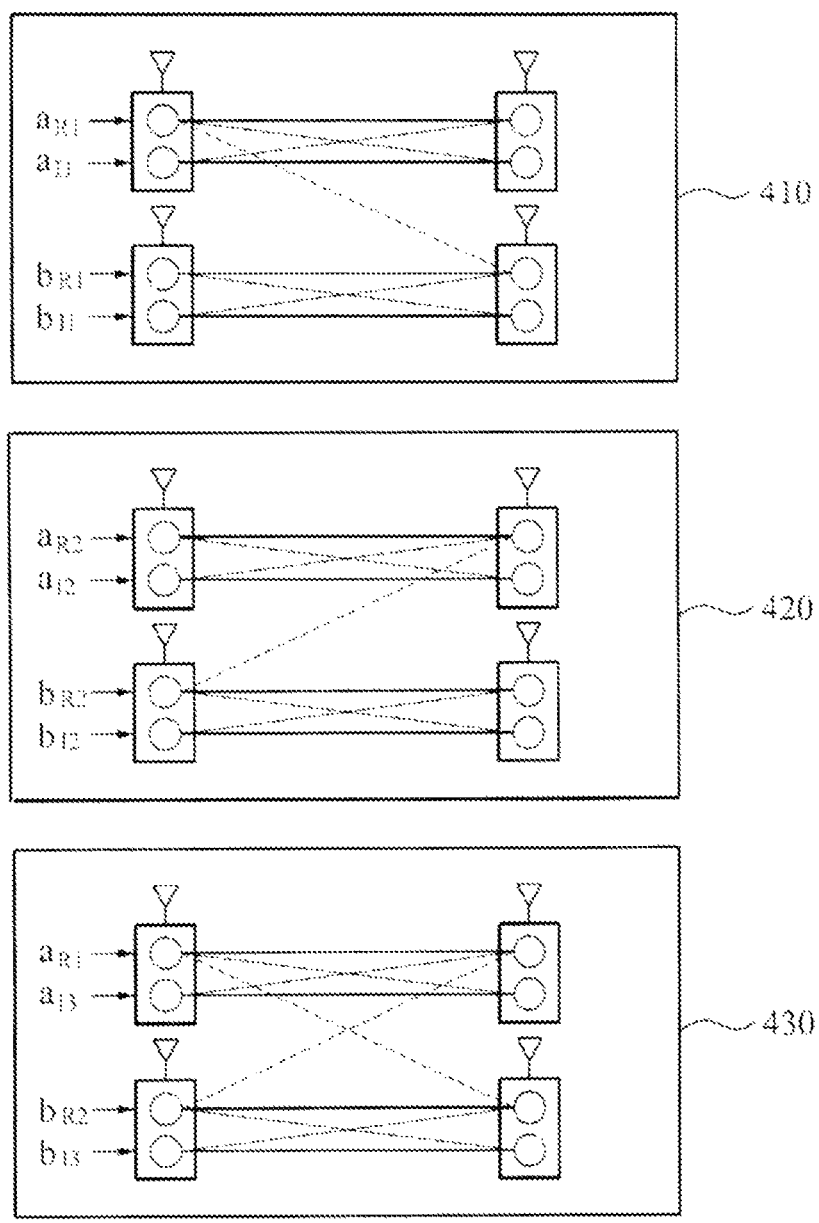
FIG. 4 is a diagram illustrating an example of an interference control scheme using classification of signals in a multi-hop network, in accord with an embodiment.

Interference control scheme using classification of signals in multi-hop network FIG. 4 illustrates an example of an interference control scheme using classification of signals in a multi-hop network, in accord with an embodiment.

Referring to FIG. 4, a relay node receives a symbol from each source node among node pairs, and relays the received symbol to each destination node pairing up with the source nodes. For example, a source node may classify symbols into real number component symbols and imaginary number component symbols, and may transmit the classified symbols to a destination node pairing up with the source node. In this example, a relay node may relay the real number component symbols and the imaginary number component symbols to the destination node. A signal received by the destination node may be represented, as shown in Equation 13.

$$\begin{bmatrix} Y_R \\ Y_I \end{bmatrix} = \begin{bmatrix} h_R & -h_I \\ h_I & h_R \end{bmatrix} \begin{bmatrix} X_R \\ X_I \end{bmatrix} + \begin{bmatrix} n_R \\ n_I \end{bmatrix}$$ [Equation 13]

In Equation 13, $Y_R$ denotes a real number component symbol received at a destination node, $Y_I$ denotes an imaginary number component symbol received at the destination node, $X_R$ denotes a real number component symbol transmitted from a source node, and $X_I$ denotes an imaginary number component symbol transmitted from the source node. Additionally, $$\begin{bmatrix} h_R & -h_I \\ h_I & h_R \end{bmatrix}$$

indicates a channel matrix between a source node and a destination node, $N_R$ denotes a real number component of a noise signal, and $N_I$ denotes an imaginary number component of a noise signal.

In an example in which two node pairs and two relay nodes are provided, the relay nodes simultaneously receive real number component symbols and imaginary number component symbols from source nodes. The relay nodes also relay the real number component symbols, and the imaginary number component symbols to destination nodes by adjusting channel coefficients. The destination nodes receive signals from the relay nodes, and extract the real number component symbols, and the imaginary number component symbols based on the received signals. In an example, through a symbol transmission process, the relay nodes relay the real number component symbols and the imaginary number component symbols to the node pairs. For example, the node pairs and the relay nodes transmit signals from a first symbol transmission process to a third symbol transmission process.

In a symbol transmission process 410, a first source node transmits a real number component symbol $a_{R1}$ and an imaginary number component symbol $a_{I1}$ to a first relay node. A second source node transmits a real number component symbol $b_{R1}$ and an imaginary number component symbol $b_{I1}$ to a second relay node. By adjusting a channel coefficient, the first relay node relays the received real number component symbol $a_{R1}$, and the received imaginary number component symbol $a_{I1}$ to a first destination node and a second destination node. In addition, by adjusting the channel coefficient, the second relay node relays the received real number component symbol $b_{R1}$, and the received imaginary number component symbol $b_{I1}$ to the first destination node and the second destination node.

For example, the first relay node and the second relay node adjust the channel coefficients and, among all interference channels, enable an interference channel for the real number component symbol $a_{R1}$ between the first source node and the second destination node. The first relay node and the second relay node remove the other interference channels. The first relay node and the second relay node relay the real number component symbols $a_{R1}$ and $b_{R1}$ and the imaginary number component symbols $a_{I1}$ and $b_{I1}$ from the first source node and the second source node to the first destination node and the second destination node. The first relay node and the second relay node relay the real number component symbols $a_{R1}$ and $b_{R1}$ and the imaginary number component symbols $a_{I1}$ and $b_{I1}$ using channels other than the removed interference channels.

In a symbol transmission process 420, a first source node transmits a real number component symbol $a_{R2}$, and an imaginary number component symbol $a_{I1}$, to a first relay node. A second source node transmits a real number component symbol $b_{R2}$ and an imaginary number component symbol $b_{I2}$ to a second relay node. The first relay node relays the received real number component symbol $a_{R2}$, and the received imaginary number component symbol $a_{I1}$, to a first destination node and a second destination node by adjusting a channel coefficient. The second relay node relays the received real number component symbol $b_{R2}$ and the received imaginary number component symbol $b_{I2}$ to the first destination node and the second destination node by adjusting a channel coefficient. For example, the first relay node and the second relay node adjust the channel coefficients and, among all interference channels, enable an interference channel for the real number component symbol $b_{R2}$ between the second source node and the first destination node. The first relay node and the second relay node remove the other interference channels. Using channels other than the removed interference channels, the first relay node and the second relay node relay the real number component symbols $a_{R2}$ and $b_{R2}$ and the imaginary number component symbols $a_{I2}$ and $b_{I2}$ from the first source node and the second source node to the first destination node and the second destination node.

In a symbol transmission process 430, a first source node transmits a real number component symbol $a_{R1}$ and an imaginary number component symbol $a_{I3}$ to a first relay node. A second source node transmits a real number component symbol $b_{R2}$, and an imaginary number component symbol $b_{I3}$ to a second relay node. The first relay node adjusts a channel coefficient and relays the received real number component symbol $a_{R1}$ and the received imaginary number component symbol $a_{I3}$ to a first destination node and a second destination node. The second relay node adjusts a channel coefficient and relays the received real number component symbol $b_{R2}$ and the received imaginary number component symbol $b_{I3}$ to the first destination node and the second destination node. For example, the first relay node and the second relay node adjust the channel coefficients and enable an interference channel, among all interference channels, for the real number component symbol $a_{R1}$ between the first source node and the second destination node. The first relay node and the second relay node also enable an interference channel, among all interference channels, for the real number component symbol $b_{R2}$ between the second source node and the first destination node. The first relay node and the second relay node remove the other interference channels. Using channels other than the removed interference channels, the first relay node, and the second relay node relay the real number component symbols $a_{R1}$ and $b_{R2}$, and the imaginary number component symbols $a_{I3}$ and $b_{I3}$ from the first source node and the second source node to the first destination node and the second destination node.

Method of Controlling Interference in Relay Nodes in Multi-Hop Network

Figure 5:
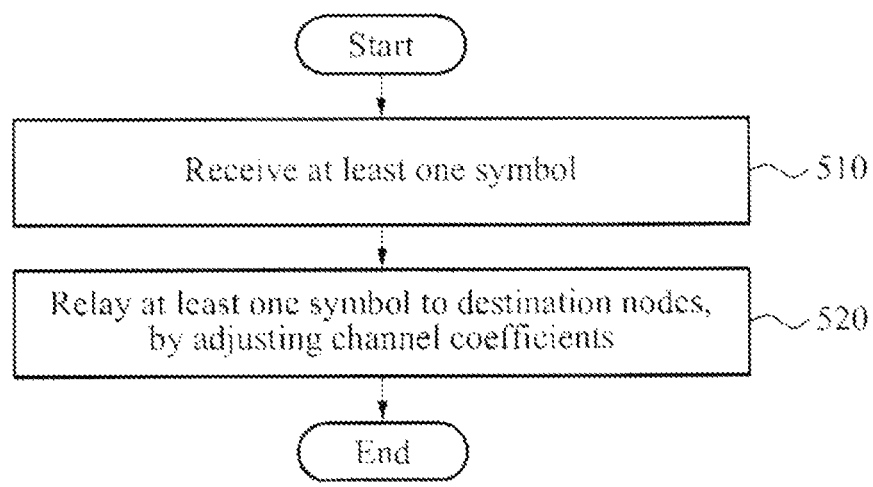
FIG. 5 is a flowchart illustrating an example of a method to control interference in relay nodes in a multi-hop network, in accord with an embodiment.

FIG. 5 illustrates an example of a method of controlling interference in relay nodes in a multi-hop network, in accord with an embodiment.

Referring to FIG. 5, at operation 510, in response to node pairs simultaneously transmitting at least one symbol, the method at relay nodes receives the at least one symbol from source nodes. The node pairs may be represented as K node pairs, and the at least one symbol may be represented as N symbols. In the method of FIG. 5, the at least one symbol is relayed from the relay nodes through at least one symbol transmission process. The at least one symbol transmission process may be represented as M symbol transmission processes. M indicates a number of symbol transmission processes equal to or greater than N indicating a number of the symbols transmitted from the K node pairs. The M symbol transmission processes correspond to M time slots. Accordingly, each of the at least one symbol transmission process may be performed over time. Additionally, the M symbol transmission processes may correspond to M frequency bands. For example, each of the at least one symbol transmission process are performed using multiple subcarriers and multiple subbands in an OFDM.

In an example, the method receives at the relay nodes the at least one symbol from the source nodes using a channel matrix between the relay nodes and the source nodes.

In another example, the method simultaneously receives at the relay nodes a real number component symbol and an imaginary number component symbol from the source nodes.

At operation 520, the method adjusts the channel coefficients at the relay nodes and relays the at least one symbol from the source nodes to destination nodes. The method may adjust the channel coefficients based on the M symbol transmission processes. In an example, the method uses one of an amplify-and-forward (AF) scheme, a quantize-and-forward (QF) scheme, and a compute-and-forward (CF) scheme based on the channel coefficients. In the AF scheme, the method amplifies a source signal using power scaling, and forwards the amplified source signal to a destination node. In the QF scheme, the method quantizes and compresses a source signal and forwards the compressed source signal. Additionally, in the CF scheme, the method generates a new signal based on a source signal using a lattice code, and forwards the new signal to a destination node.

In an example, method relays from the relay nodes at least one symbol, using channels between node pairs and the relay nodes. The method at the relay nodes removes at least one interference channel, from among channels between source nodes and destination nodes, by adjusting channel coefficients. In this example, the method receives at relay nodes channel information between the relay nodes and at least one source node among the source nodes from the at least one source node. The method also transmits channel information between the relay nodes and at least one destination node among the destination nodes to the at least one destination node. Additionally, the method receives feedback information at the relay nodes for the channel information between the relay nodes and the at least one destination node from the at least one destination node, adjusts the channel coefficients based on the received feedback information, and removes the at least one interference channel.

Using the channels between the source nodes and the destination nodes, the method relays from the relay nodes the at least one symbol from which the at least one interference channel is removed.

In another example, the method generates at the relay nodes an end-to-end channel matrix, using a first channel matrix between the source nodes and the relay nodes, a second channel matrix between the relay nodes and the destination nodes, and the channel coefficients. The method may also relay at least one symbol from the source nodes to the destination nodes, using the end-to-end channel matrix.

For example, when two node pairs are provided, the method relays from the relay nodes at least one symbol through a first symbol transmission process through a third symbol transmission process.

In the first symbol transmission process, the method removes at the relay nodes an interference channel between a second source node and a first destination node, and relays at least one symbol. For example, the method receives at the relay nodes channel information between the second source node and the relay nodes from the second source node, and transmits channel information between the relay nodes and the first destination node to the first destination node. Additionally, the method receives at the relay nodes feedback information for the channel information between the relay nodes and the first destination node from the first destination node, adjusts the channel coefficients based on the received feedback information, and removes the interference channel between the second source node and the first destination node.

In a second symbol transmission process, the method receives at the relay nodes an interference channel between a first source node and a second destination node, and may relay at least one symbol. For example, the method receives at the relay nodes channel information between the first source node and the relay nodes from the first source node, and transmits channel information between the relay nodes and the second destination node to the second destination node. Additionally, the method receives at the relay nodes feedback information for the channel information between the relay nodes and the second destination node from the second destination node, adjusts the channel coefficients based on the received feedback information, and removes the interference channel between the first source node and the second destination node.

In the third symbol transmission process, the method relays at the relay nodes at least one symbol, using channels between source nodes and destination nodes. For example, from the first source node, the method receives at the relay nodes a symbol that is identical to a symbol received from the first source node in the first symbol transmission process. Additionally, from the second source node, the method receives at the relay nodes a symbol that is identical to a symbol received from the second source node in the second symbol transmission process.

For example, when three node pairs are provided, the method at the relay nodes relays at least one symbol through a first symbol transmission process and a second symbol transmission process.

In the first symbol transmission process, the method at the relay nodes removes an interference channel between a first source node and a second destination node, and an interference channel between the first source node and a third destination node, and relays at least one symbol. The method at the relay nodes receives at least one symbol from each of the first source node and a second source node.

In the second symbol transmission process, the method at the relay nodes relays at least one symbol using channels between source nodes and destination nodes. For example, the method at the relay nodes receives at least one symbol from each of the second source node and a third source node.

In still another example, the method at the relay nodes relays a real number component symbol and an imaginary number component symbol to the destination nodes by adjusting the channel coefficients.

The above description with reference to FIGS. 1 through 4 may equally be applied to the method of FIG. 5 and accordingly, further description of the method is omitted herein.

Method of Controlling Interference in Node Pairs in Multi-Hop Network

Figure 6:
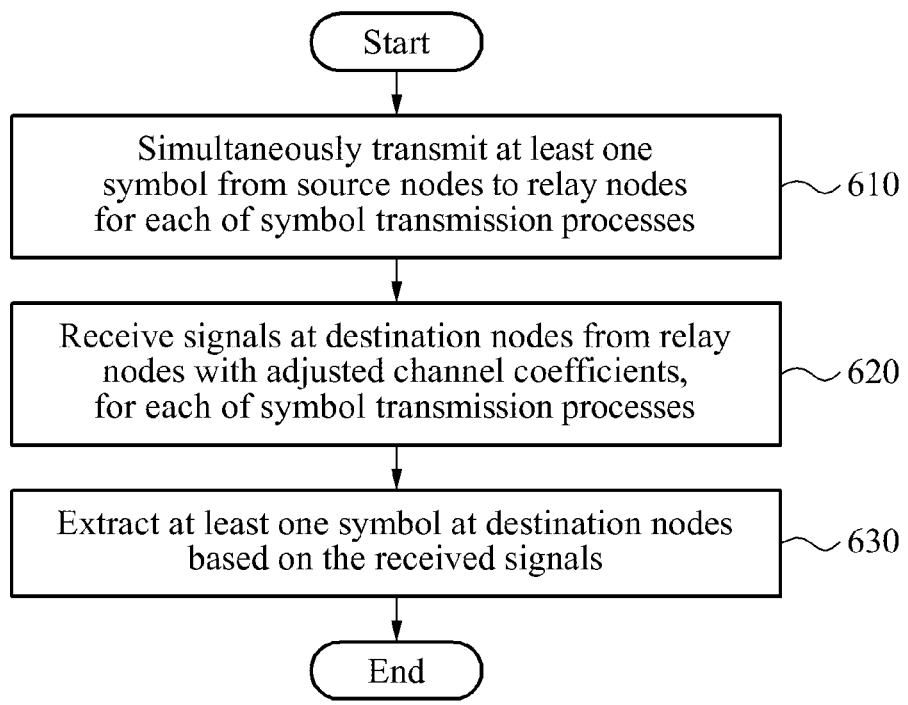
FIG. 6 is a flowchart illustrating an example of a method to control interference in node pairs in a multi-hop network, in accord with an embodiment.

FIG. 6 illustrates an example of a method of controlling interference in node pairs in a multi-hop network, in accord with an embodiment.

Referring to FIG. 6, at operation 610, the method simultaneously transmits from source nodes to relay nodes at least one symbol for each of symbol transmission processes. For example, M, which indicates a number of the symbol transmission processes, may be equal to or greater than N, which indicates a number of symbols transmitted by K node pairs. Additionally, M symbol transmission processes may correspond to M time slots, and may also correspond to M frequency bands.

In an example, the method simultaneously transmits from the source nodes a real number component symbol and an imaginary number component symbol to the relay nodes for each of the symbol transmission processes.

At operation 620, for each of the symbol transmission processes, the method receives at the destination nodes signals from the relay nodes with adjusted channel coefficients.

At operation 630, the method extracts at the destination nodes at least one symbol based on the received signals. For example, for each of the M symbol transmission processes the method extracts or decodes the N symbols transmitted by the source nodes pairing up with the destination nodes based on the received signals.

In an example, the method extracts at the destination nodes a real number component symbol and an imaginary number component symbol based on the received signals.

The above description with reference to FIGS. 1 through 4 may equally be applied to the method of FIG. 6 and accordingly, further description of the method is omitted herein.

The source nodes, the relay nodes, and the destination nodes described herein may be implemented using hardware components. For example, the hardware components may include processing devices, controllers, microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

It is to be understood that in the embodiment of the present invention, the operations in FIGS. 5-6 are performed in the sequence and manner as shown although the order of some operations and the like may be changed without departing from the spirit and scope of the described configurations. In accordance with an illustrative example, a computer program embodied on a non-transitory computer-readable medium may also be provided, encoding instructions to perform at least the method described in FIGS. 5-6.

Program instructions to perform a method described in FIGS. 5-6, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein may be easily construed by programmers skilled in the art to which the embodiments pertain based on and using the flow diagrams and block diagrams of the figures and their corresponding descriptions as provided herein.

As a non-exhaustive illustration only, a terminal or device described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method to control interference in relay nodes, comprising:
    simultaneously receiving a symbol from source nodes;
    adjusting channel coefficients for each of symbol transmission processes; and
    relaying the symbol to destination nodes with adjusted channel coefficients,
    wherein the simultaneously receiving and the relaying are performed during each of the symbol transmission processes between the source and destination nodes,
    wherein the relaying of the symbol comprises relaying the symbol through channels between the source and destination nodes, and
    wherein the relaying of the symbol comprises:
        removing an interference channel from among channels between the source nodes and the destination nodes by adjusting the channel coefficients; and
        relaying the symbol, using the channels between the source nodes and the destination nodes from which the interference channel is removed.

2. The method of claim 1, wherein the number of the symbol transmission process is equal to or greater than the number of symbols simultaneously received.

3. The method of claim 1, wherein the relaying of the symbol comprises using one of an amplify-and-forward (AF) scheme, a quantize-and-forward (QF) scheme, and a compute-and-forward (CF) scheme, based on the channel coefficients.

4. The method of claim 1, wherein the symbol transmission process corresponds to a time slot.

5. The method of claim 1, wherein the symbol transmission process corresponds to a frequency band.

6. The method of claim 1, wherein the removing of the interference channel comprises:
receiving, from a source node among the source nodes, channel information between the source node and relay nodes;
transmitting channel information between the relay nodes and a destination node among the destination nodes to the destination node;
receiving feedback information for the channel information between the relay nodes and the destination node from the destination node; and
adjusting the channel coefficients based on the feedback information and removing the interference channel.

7. The method of claim 1, wherein the relaying of the symbol comprises:
generating an end-to-end channel matrix, using a first channel matrix between the source nodes and relay nodes, a second channel matrix between the relay nodes and the destination nodes, and the channel coefficients; and
relaying the symbol from the source nodes to the destination nodes using the end-to-end channel matrix.

8. The method of claim 1, wherein, in response to two source nodes and two destination nodes being provided, the receiving, and the relaying are performed during a first symbol transmission process, a second symbol transmission process, and a third symbol transmission process.

9. The method of claim 8, wherein the relaying of the symbol comprises:
in the first symbol transmission process, relaying the symbol by removing an interference channel between a second source node and the first destination node;
in the second symbol transmission process, relaying the symbol by removing an interference channel between the first source node and a second destination node; and
in the third symbol transmission process, relaying the symbol, using channels between the source nodes and the destination nodes.

10. The method of claim 9, wherein, in the third symbol transmission process, the receiving of the symbol comprises:
receiving a symbol from the first source node, the symbol being identical to a symbol received from the first source node in the first symbol transmission process; and
receiving a symbol from the second source node, the symbol being identical to a symbol received from the second source node in the second symbol transmission process.

11. The method of claim 9, wherein the relaying of the symbol in the first symbol transmission process comprises:
receiving channel information between the second source node and relay nodes from the second source node;
transmitting channel information between the relay nodes and the first destination node to the first destination node;
receiving feedback information for the channel information between the relay nodes and the first destination node from the first destination node;
adjusting the channel coefficients based on the feedback information; and
removing the interference channel between the second source node and the first destination node.

12. The method of claim 9, wherein the relaying of the symbol in the second symbol transmission process comprises:
receiving channel information between the first source node and relay nodes from the first source node;
transmitting channel information between the relay nodes and the second destination node to the second destination node;
receiving feedback information for the channel information between the relay nodes and the second destination node from the second destination node;
adjusting the channel coefficients based on the feedback information; and
removing the interference channel between the first source node and the second destination node.

13. The method of claim 1, wherein, in response to three source nodes and three destination nodes being provided, the receiving and the relaying are performed during a first symbol transmission process and a second symbol transmission process.

14. The method of claim 13, wherein the relaying of the symbol comprises:
in the first symbol transmission process, relaying the symbol by removing an interference channel between the first source node and a second destination node, and an interference channel between the first source node and a third destination node; and
in the second symbol transmission process, relaying the symbol using channels between the source nodes and the destination nodes.

15. The method of claim 14, wherein the receiving of the symbol comprises:
in the first symbol transmission process, receiving the symbol from each of the first source node and the second source node; and
in the second symbol transmission process, receiving the symbol from each of the second source node and a third source node.

16. A method of controlling interference in node pairs, comprising:
simultaneously receiving, by each relay node of relay nodes, a symbol from source nodes for each of at least one symbol transmission process;
transmitting to destination nodes signals for each of the at least one symbol transmission process with adjusted channel coefficients; and
extracting the symbol from the signals transmitted.

17. A method of controlling interference in relay nodes, comprising:
simultaneously receiving a real number component symbol and an imaginary number component symbol from source nodes; and
relaying the real number component symbol and the imaginary number component symbol to destination nodes with adjusted channel coefficients for each of at least one symbol transmission process,
wherein the simultaneously receiving and the relaying are performed during a symbol transmission process between the source and destination nodes, and
wherein the relaying comprises:
removing an interference channel using the adjusted channel coefficients; and transmitting the real number component symbol and the imaginary number component symbol using the adjusted channels from which the interference channel is removed.

18. A method of controlling interference in node pairs, comprising:
   simultaneously receiving, by each relay node of relay nodes, a real number component symbol and an imaginary number component symbol from source nodes, for each of at least one symbol transmission process;
   transmitting to destination nodes, signals for each of the at least one symbol transmission process with adjusted channel coefficients; and
   extracting the real number component symbol and the imaginary number component symbol from the signals transmitted.

19. An apparatus to control interference, comprising:
   relay nodes, each relay node configured to simultaneously:
      receive a symbol from source nodes;
      adjust channel coefficients for each of symbol transmission processes; and
      relay the symbol to destination nodes with adjusted channel coefficients,
   wherein each of the relay nodes simultaneously receives and the relays the symbol during each of the symbol transmission process taking place between the source nodes and the destination nodes,
   wherein the relaying of the symbol comprises:
      removing an interference channel from among the channels between the source nodes and the destination nodes by adjusting the channel coefficients; and
      relaying the symbol using the channels between the source nodes and the destination nodes from which the interference channel is removed.

20. An apparatus to control interference in node pairs, comprising:
   relay nodes, each relay node configured to simultaneously:
      receive a symbol from source nodes for each of at least one symbol transmission process;
      transmit, to destination nodes, signals for each of the at least one symbol transmission process with adjusted channel coefficients; and
      extract the symbol from the transmitted signals.

* * * * *